United States Patent [19]

Lee et al.

[11] Patent Number: 4,778,642

[45] Date of Patent: Oct. 18, 1988

[54] SEALANT BEAD PROFILE CONTROL

[75] Inventors: Jay Lee, Kings Park; Alex Mauro, Wheatley Heights, both of N.Y.

[73] Assignee: Robotic Vision Systems, Inc., Hauppauge, N.Y.

[21] Appl. No.: 875,262

[22] Filed: Jun. 17, 1986

[51] Int. Cl.$^4$ .................. B05C 11/06; B05D 1/26; B29C 47/02

[52] U.S. Cl. .................... 264/510; 118/62; 118/63; 264/259; 264/296; 264/500; 264/DIG. 50; 425/72.1; 425/110; 425/326.1; 425/387.1; 427/348

[58] Field of Search ............... 264/259, 296, 510, 500, 264/DIG. 50; 427/348; 239/296; 118/56, 62, 63; 425/72 R, 110, 326.1, 387.1, 461

[56] References Cited

U.S. PATENT DOCUMENTS

| | | | |
|---|---|---|---|
| 3,054,716 | 9/1962 | Bergstein et al. | 264/510 X |
| 3,193,406 | 7/1965 | Mittelman | 427/348 |
| 3,329,523 | 7/1967 | Best et al. | 427/348 X |
| 3,953,626 | 4/1976 | Suzuki et al. | 427/348 X |
| 4,246,301 | 1/1981 | Alheid et al. | 427/348 |

Primary Examiner—Jeffery Thurlow
Assistant Examiner—Leo B. Tentoni
Attorney, Agent, or Firm—Max Fogiel

[57] ABSTRACT

An arrangement for improved dispensed material bead profile control, in which a viscous material is dispensed in a stream upon a surface. The stream is transported along that surface and forms a bead of the viscous material. The bead is then confined with air streams which also reshape the profile of the bead. The material is dispensed by a nozzle which has at least two orifices in its proximity. One orifice is located at a distance from the nozzle which is greater than for the other orifice. The orifices form air streams under pressure and direct the air streams toward the material stream, as well as toward the bead formed on the surface when the material stream is transported along that surface.

8 Claims, 5 Drawing Sheets

PRIOR ART

SEALANT BEAD PROFILE CONTROL

BACKGROUND OF THE INVENTION

In the automatic deposition of sealant material by a robot carrying a dispensing tool, known methods and devices do not adequately control the profile of the resulting sealant bead. As a result it is often necessary to use extra material to obtain an effective seal. The desired profile may be a function of the type of material joint being sealed, so that a flexible system is needed. Accurate control may also be needed to provide an aesthetically pleasing result. A source of air is generally available or can be readily obtained and air has properties that make air a reasonable choice for controlling the bead profile. Copending application Ser. No. 840,326 filed Mar. 14, 1986, now U.S. Pat. No. 4,709,858, provides a means for flow control and air assisted shaping that represents the state of the art.

SUMMARY OF THE INVENTION

It is an object of the present invention to overcome the prior art disadvantages. In particular, it is the object of the present invention to provide a method and arrangements for greater control over the head profile of a material being dispensed.

In keeping with this object and with still others which will become apparent as the description proceeds, the important characteristics of the invention are: accuracy of bead profile control, rapid response and reliable operation.

The present invention is comprised as follows: a viscous material is forced through a nozzle containing a narrow exit orifice aimed at a surface upon which the material is to be deposited. The material will be deposited with a certain bead profile depending on the distance to the surface; pressure on the material; material viscosity; orifice diameter, shape and length; surface shape and smoothness; and speed with which the orifice passes over the surface. Several strategically placed orifices located aft of the nozzle, that is, following the nozzle in the given direction of travel of the nozzle, direct streams of air at the bead to reshape it into the desired shape. By selectively applying air pressure to the orifices, various shapes may be obtained.

In a second embodiment, orifice groups are placed symmetrically around the nozzle. By selectively applying air pressure to the orifice groups, bead profile control is provided for application of material in any direction.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

BRIEF DESCRIPTION OF THE DRAWINGS

FIG. 4b shows a vertical cross section of 4a.

DESCRIPTION OF THE PREFERRED EMBODIMENT

Figure 1A:
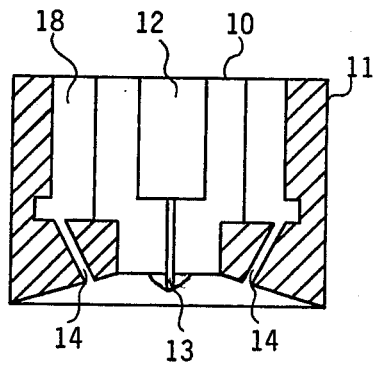
FIG. 1a shows a cross section of a prior art spray gun cap.

FIG. 1a shows a cross section of a prior art spray gun cap 11. A viscous material, such as sealant, is delivered to cavity 12 under pressure that forces the material through an orifice in nozzle 10. The material exits from the orifice at opening 13 and usually follows a narrow path to a surface upon which the material is to be deposited.

Figure 1B:
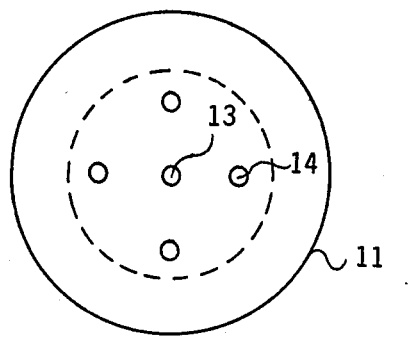
FIG. 1b shows a bottom view of the spray gun cap.

FIG. 1b shows a bottom view of the spray gun cap 11 with opening 13. Four holes 14 may surround opening 13, as shown, and emit streams of air with sufficient force to help shape the bead of the deposited material.

Figure 1C:
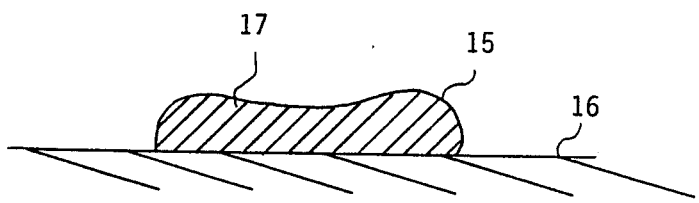
FIG. 1c shows a cross section of a sealant bead.

FIG. 1c shows a cross section of material 17 deposited on a surface 16 from a spray gun cap that moves parallel to surface 16 and perpendicular to the plane of the cross section at a velocity sufficient to prevent build-up of the bead profile 15 beyond the amount shown. Profile 15 may be adjusted in any one of several ways: by varying the air pressure present behind holes 14; by varying the pressure on the material in cavity 12; by varying the dispensed material viscosity; by altering the distance of the spray gun cap from surface 16; or by changing the translation velocity of the spray gun cap. Although this provides some profile control, it is often insufficient to obtain the desired results.

Figure 2:
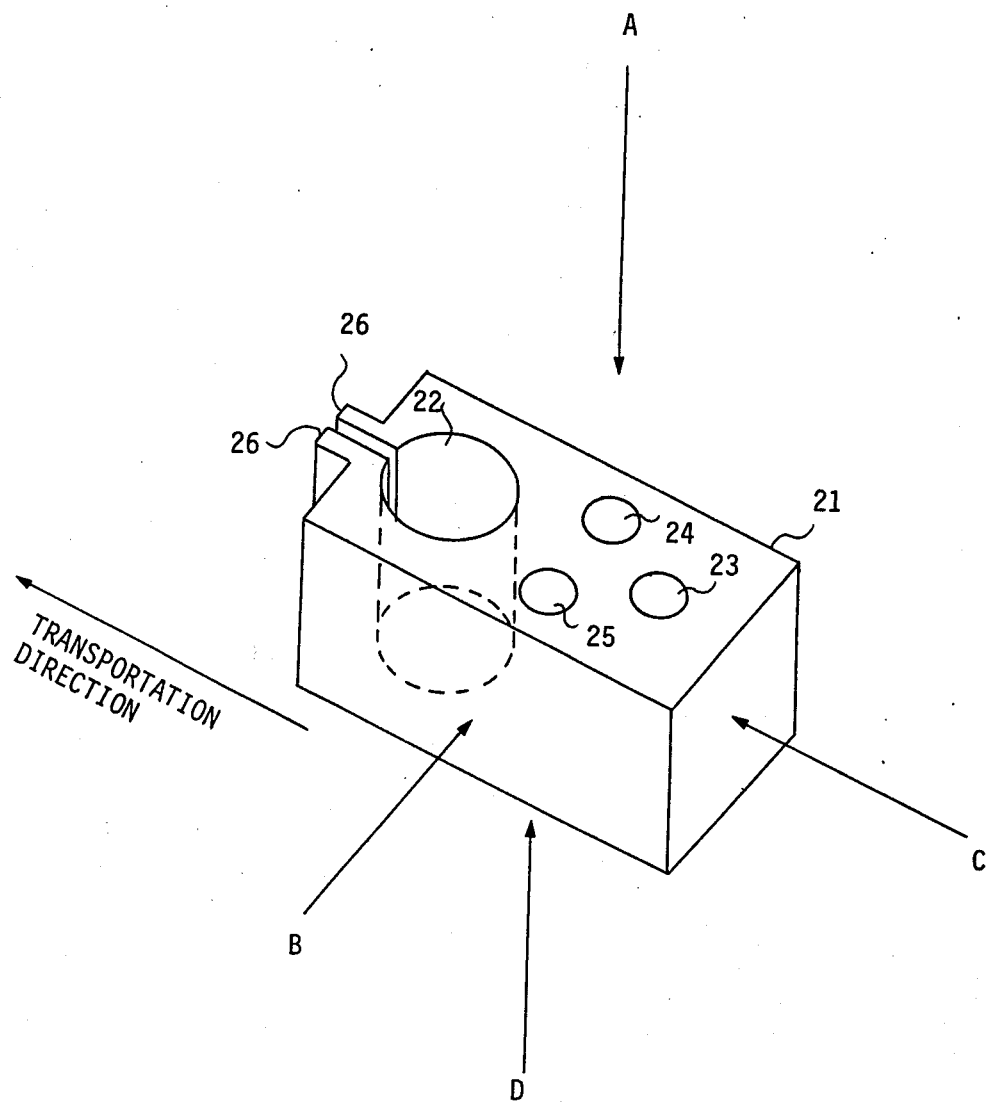
FIG. 2 shows the improved dispensing head.

FIG. 2 shows an improved dispensing head arrangement. The prior art spray gun cap can be placed in cavity 22 of block 21 and secured via a clamping force provided by drawing flanges 26 together in the conventional manner. Alternatively, a material dispensing orifice can be machined in block 21 or a material dispensing nozzle can be set into block 21 with no change in performance.

Figure 3A:
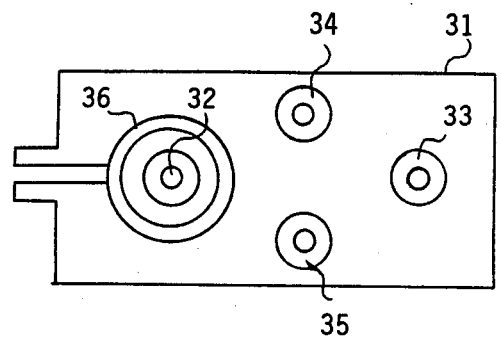
FIG. 3a shows a view in direction A of FIG. 2.
Figure 3B:
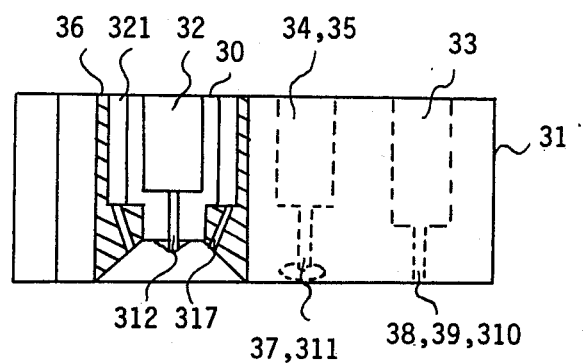
FIG. 3b shows a view in direction B of FIG. 2.

When dispensing material, block 21 is transported in the direction of flanges 26, as indicated, parallel to the surface upon which the material is deposited. Air is applied to cavities 23, 24 or 25 with orifices that direct air streams at the material bead just aft of where the material comes into contact with the surface. FIG. 3 provides greater detail of this arrangement. A top view of dispensing head 21 is given in FIG. 3a where the dispensing head block is identified as 31 with cavities 33, 34 and 35 enabling air to reach aiming orifices 37, 38, 39, 310, 311 as seen in FIG. 3b. Spray gun cap 36 has a central chamber 32 through which the viscous fluid reaches the dispensing orifice 312. A cylindrical wall 30 separates cavity 32 from chamber 321 through which air can reach aiming orifices 317. A side view of dispensing head 21 with a cutaway through the center of spray gun cap 36 is given in FIG. 3b.

Figure 3C:
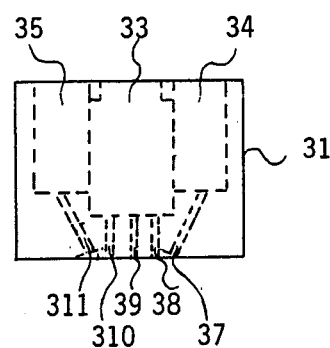
FIG. 3c shows a view in a direction C of FIG. 2.

FIG. 3c provides an end view of dispensing head 21 in which the outline of the head 31 is seen. Cavities 33, 34, 35 and air orifices 37, 38, 39, 310, 311 are shown as hidden lines.

Figure 3D:
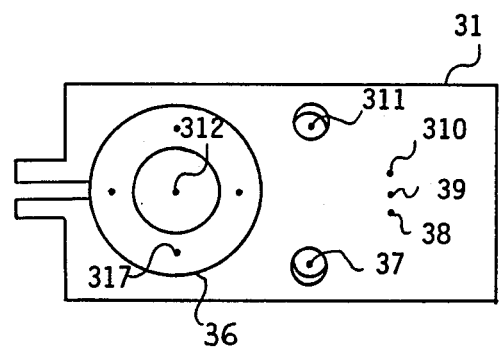
FIG. 3d shows a view in direction D of FIG. 2.
Figure 3E:
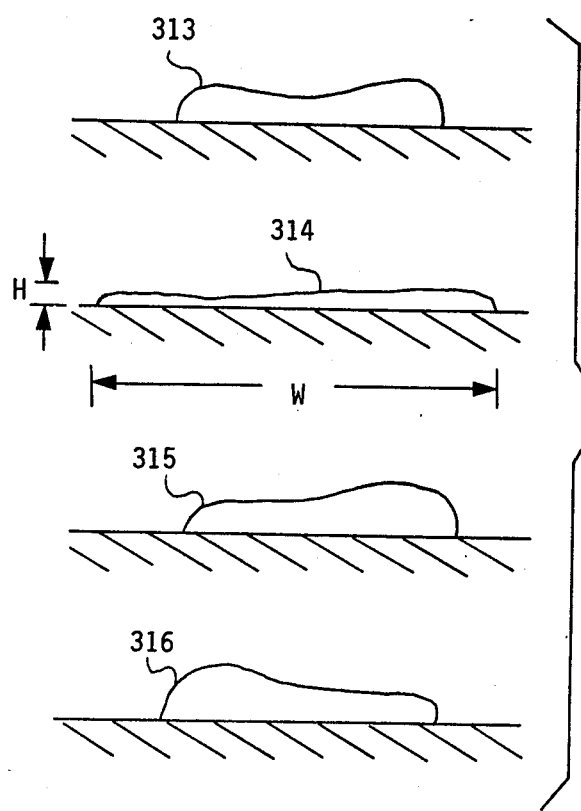
FIG. 3e shows cross sections of sealant beads with different profiles.
Figure 4A:
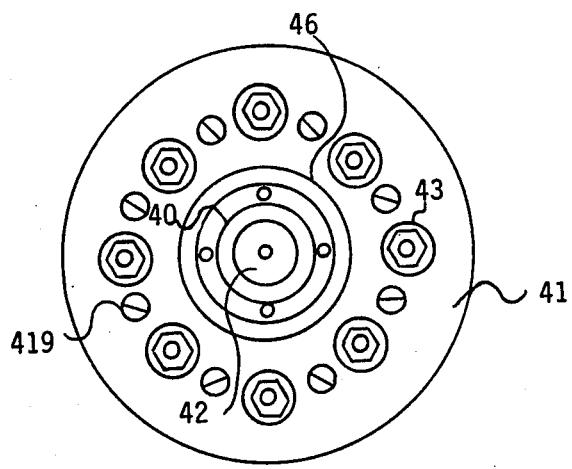
FIG. 4a shows a top view of a multidirectional dispensing head of the improved design of the present invention.
Figure 4B:
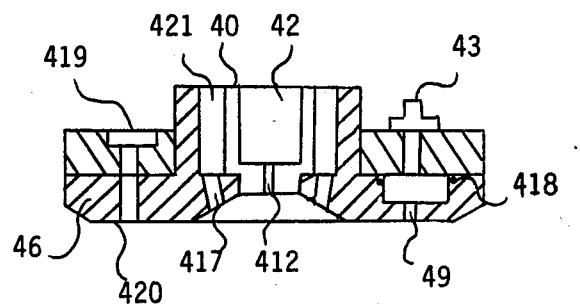
Figure 4C:
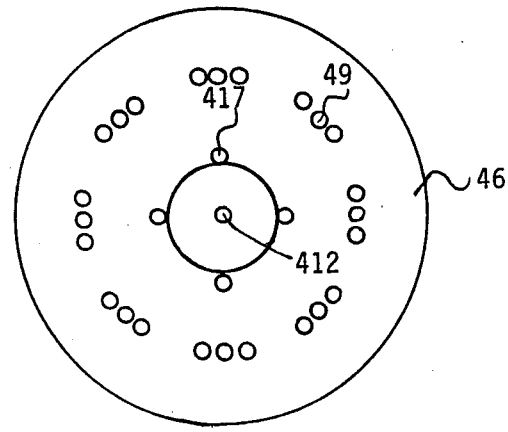
FIG. 4c shows a bottom view of the multidirectional dispensing head.

FIG. 3d provides a botton view of dispensing head 21 where the head outline 31 is seen with air orifices 37, 38, 39, 310, 311, 317, and viscous fluid dispensing orifice 312.

Viscous material forced through orifice 312 will exit as a diverging stream deposited on a surface over which the dispensing head 31 is transported. Air forced through orifices 317 form streams that confine the bead formed by the dispensed material such as shown in bead cross section 313 of FIG. 3*e*. This cross section is orthogonal to the direction of travel.

The improvement of dispensing head 21, 31 over the prior art comes from its ability to provide further control over the shape of the bead. By orienting head 31 so that air orifices 38, 39, 310 pass over the bead after it has been dispensed from orifice 312—that is the direction of travel is such that orifice 312 is ahead of orifice 39—the air streams emanating from orifices 38, 39, 310 due to air introduced into cavity 33 under pressure, will flatten the bead from a profile 313 to a profile 314. This method of profile control has been found to provide more accurate control of height H and width W than can be achieved by varying the controlling parameters of the prior art spray gun head. When bead profiles similar to that shown in cross sections 315 or 316 are needed, air under pressure is introduced into cavities 35 or 34 rather than 33, and orifices 311 or 37 direct air streams that force the bead into the desired shape.

FIG. 4 shows a further improvement in which orientation of the dispensing head is less restricting. Rather than limiting the direction of transport to one direction without reorientation of the head, the head shown in FIG. 4 can be transported in any one of 8 directions. Further, reorientation, when needed, is reduced from a maximum of 180° to 180°/8. FIG. 4*a* shows the top of the dispensing head made up of two main parts 41 and 46 shown in cross section in FIG. 4*b*. A bottom view of the head is shown in FIG. 4*c* in which the bottom part 46 is seen to have 8 sets of air orifices 49, symmetrically placed around the central orifice 412 from which the viscous material is dispensed. Air orifices 417 are symmetrically placed around orifice 412 for normal air-assisted beam profile control. The outer air orifices 49, enable the increased bead profile control described for the dispensing head of FIG. 3. Air forced out of appropriate sets of orifices 49 forms into streams that reshape the bead profile as desired. The set 49 selected, is based on the direction of head travel and profile shape needed.

Separate air inlets 43 enable the individual selection of orifice sets 49 and independent air pressure control for each set 49. Seal 418 ensures a tight junction between parts 41 and 46 to prevent loss of air pressure which would affect control accuracy. Screws 419 or other means of attachment hold parts 41 and 46 together. The viscous material to be dispensed is introduced into cavity 42 and forced out through orifice 412 by pressure on the material. Typically, cavity 42 and orifice 412 would be part of a nozzle 40 that fits into part 4 leaving a cavity 421 around nozzle 40 into which air under pressure may be introduced. Air in cavity 420 is forced out of orifices 417 to form streams to shape the dispensed material bead. Surface 420 is normally oriented parallel to the surface upon which the material is to be deposited, and a short distance above the surface such that the air streams from orifices 417 and 49 strike the bead correctly for the shape needed.

Of course more or fewer sets of orifices may be used than the number used in these examples.

The present invention has been described and illustrated with reference to an exemplary embodiment. It is not to be considered limited thereto, inasmuch as all modifications and variations which might offer themselves, are intended to be encompassed within the scope of the appended claims.

What is claimed is:

1. A method for improved dispensed material bead profile control, comprising the steps of: dispensing viscous material under pressure in a material stream upon a surface; forming air into a first air stream and directing said first air stream under pressure toward said material stream; said first air stream having an origin location spaced at a first predetermined distance from the origin location of said material stream; forming air under pressure into at least a second air stream having an origin location spaced from the origin location of said material stream by a second predetermined distance, said material stream forming a bead on said surface, said first air stream shaping said bead into a predetermined shape; and directing said second air stream toward said bead formed on said surface when said material stream is transported along said surface, said material stream being directed so that said origin location of said second air stream passes over said bead after formation on said surface and the origin location of said material stream is ahead of said origin location of said second air stream in direction of travel, said second air stream controlling the shape of the bead by flattening said bead to a predetermined height and width.

2. A method for improved dispensed material bead profile control, comprising the steps of: dispensing viscous material under pressure in a material stream upon a surface, forming air into first air streams and directing said first air streams under pressure toward said material stream; said first air streams having at least two origin locations spaced at a first predetermined distance from the origin location of said material stream; forming air under pressure into at least second air streams having at least two origin locations spaced from the origin location of said material stream at a second predetermined distance; and directing said first air streams toward a bead formed on said surface when said material stream is transported along said surface, said material stream being directed so that said first air streams are abreast of said material stream, constraining said material stream to form a bead of predetermined width on said surface, said second air streams passing over said bead after formation on said surface and the origin location of said material stream is between said origin locations of said first air streams and ahead of said origin locations of said second air streams in direction of travel, said second air streams controlling the shape of the bead by flattening said bead to a predetermined height and width.

3. A method for improved dispensed material bead profile control, comprising the steps of: dispensing viscous material in a stream upon a surface; transporting said stream along said surface and forming a bead of said material; confining said bead with air streams; and impinging at least one air stream upon said material to reshape the profile of said bead.

4. A method as defined in claim 2, wherein said first and second air stream origin locations are symmetrically arranged around said origin location of said material stream.

5. A method as defined in claim 1, wherein said air under pressure is separately controllable for each origin location of said first and second air streams.

6. A method as defined in claim 2, wherein said air under pressure is separately controllable for each origin location of said second air streams.

7. A method as defined in claim 5, wherein said origin location of said second air stream comprises at least two openings.

8. A method as defined in claim 6, wherein each origin location of said second air streams comprises at least two openings.

* * * * *